(12) United States Patent
Jagadeesan (10) Patent No.: US 7,039,716 B1
(45) Date of Patent: May 2, 2006

(54) DEVICES, SOFTWARE AND METHODS FOR ENCODING ABBREVIATED VOICE DATA FOR REDUNDANT TRANSMISSION THROUGH VOIP NETWORK

(75) Inventor: Ramanathan Jagadeesan, San Jose, CA (US)

(73) Assignee: Cisco Systems, Inc., San Jose, CA (US)

( * ) Notice: Subject to any disclaimer, the term of this patent is extended or adjusted under 35 U.S.C. 154(b) by 687 days.

(21) Appl. No.: 09/702,255

(22) Filed: Oct. 30, 2000

(51) Int. Cl.
G06F 15/16 (2006.01)
H04M 7/00 (2006.01)

(52) U.S. Cl. .................. 709/236; 379/900
(58) Field of Classification Search .......... 709/236, 709/231, 247; 370/473, 494, 495; 714/746; 379/900
See application file for complete search history.

(56) References Cited

U.S. PATENT DOCUMENTS

| | | | | |
|---|---|---|---|---|
| 5,007,067 A * | 4/1991 | Ayanoglu et al. | ........... | 375/267 |
| 5,600,663 A * | 2/1997 | Ayanoglu et al. | ........... | 714/774 |
| 5,615,298 A * | 3/1997 | Chen | ........... | 704/228 |
| 5,765,127 A * | 6/1998 | Nishiguchi et al. | ........... | 704/208 |
| 5,870,412 A * | 2/1999 | Schuster et al. | ........... | 714/752 |
| 5,878,388 A * | 3/1999 | Nishiguchi et al. | ........... | 704/214 |
| 5,907,822 A * | 5/1999 | Prieto, Jr. | ........... | 704/202 |
| 5,960,388 A * | 9/1999 | Nishiguchi et al. | ........... | 704/208 |
| 6,141,788 A * | 10/2000 | Rosenberg et al. | ........... | 714/774 |
| 6,167,060 A * | 12/2000 | Vargo et al. | ........... | 370/468 |
| 6,301,558 B1 * | 10/2001 | Isozaki | ........... | 704/228 |
| 6,377,573 B1 * | 4/2002 | Shaffer et al. | ........... | 370/356 |
| 6,427,135 B1 * | 7/2002 | Miseki et al. | ........... | 704/258 |
| 6,445,717 B1 * | 9/2002 | Gibson et al. | ........... | 370/473 |
| 6,496,477 B1 * | 12/2002 | Perkins et al. | ........... | 370/228 |
| 6,502,139 B1 * | 12/2002 | Birk et al. | ........... | 709/233 |
| 6,516,435 B1 * | 2/2003 | Tsunoda | ........... | 714/751 |
| 6,584,104 B1 * | 6/2003 | McGowan | ........... | 370/394 |
| 6,675,340 B1 * | 1/2004 | Hardie et al. | ........... | 714/751 |
| 6,678,267 B1 * | 1/2004 | Anandakumar et al. | .... | 370/356 |
| 6,731,634 B1 * | 5/2004 | McGowan | ........... | 370/394 |
| 2003/0112796 A1 * | 6/2003 | Kwan | ........... | 370/352 |

OTHER PUBLICATIONS

Bolot, J.C., Adaptive FEC-Based Error Control for Internet Telephony, 1999, IEEE, pp. 1453-1460.*
Perkins, C., A survey of packet loss recovery techniques for streaming audio, 1998, Network, IEEE, vol. 12 Iss. 5 pp. 40-48.*

(Continued)

*Primary Examiner*—David Wiley
*Assistant Examiner*—J. Bret Dennison
(74) *Attorney, Agent, or Firm*—Marger Johnson & McCollom, P.C.

(57) ABSTRACT

Devices, software and methods are provided for encoding voice data to conceal packet loss. In addition to regular encoding, an abbreviated portion of the frame is encoded, and transmitted redundantly afterwards. Optionally the redundant encoding is in relation to an attribute of the sound represented by the data. The attribute of the sound can be pitch information, peak information, or bandwidth information.

55 Claims, 6 Drawing Sheets

OTHER PUBLICATIONS

Perkins, C., Options for Repair of Streaming Media, 1998, University of London, pp. 1-12.*

Carle, G., Survey of error recovery techniques for IP-based audio-visual multicast applications, 1997, Network, IEEE, vol. 11, Iss. 6 pp. 24-36.*

Perkins, C., RTP Payload for Redundant Audio data, 1997, Network Working Group, pp. 1-11.*

Rosenberg, An RTP Payload Format for Generic Forward Error Correction, 1999, Network Group, pp. 1-26.*

Kubin, g., Multiple-description coding (MDC) of Speech with an invertible auditory model, 1999, IEEE Workshop.*

* cited by examiner

DEVICES, SOFTWARE AND METHODS FOR ENCODING ABBREVIATED VOICE DATA FOR REDUNDANT TRANSMISSION THROUGH VOIP NETWORK

BACKGROUND OF THE INVENTION

1. Field of the Invention

The present invention is related to the field of telephony using a packet network protocol, and more specifically to devices, software and methods for encoding voice data to conceal packet loss.

2. Description of the Related Art

The internet is used for telephony, in addition to sending data. Accordingly, voice is encoded into digital data, the data is arranged in packets, and the packets are transmitted to the recipient over a network. This process has to happen in real time, which means that the familiar Transmission Control Protocol/Internet Protocol (TCP/IP) can not be used. Instead, other protocols are used, which permit real time use, such as the Uniform Datagram Protocol (UDP).

A disadvantage of protocols that permit real time use is that they are unreliable, in that they permit packets to be lost, without retrieving them. When that happens, the voice segments they were carrying are not reconstructed, and the recipient hears annoying gaps in speech. These gaps are perceived as reduced quality of service.

In order to conceal the fact that a packet has been lost, schemes have been devised that are called Packet Loss Concealment (PLC) schemes. According to PLC schemes, packets are generated at the receiver and played to the recipient as substitute voice. This way, at least no gap is heard in the reconstructed voice.

The simplest PLC scheme is called blind PLC, and consists of repeating to the recipient the last frame. Instead of a gap, the recipient hears the last sound extended by a little bit. This works well, to the extent that the lost packets are assumed distributed uniformly within the speech data sequence. This way, every lost packet can be reconstructed from its the previous one, which has been assumed to not be lost.

Blind PLC is unsatisfactory, because packets are not lost uniformly with time. Rather, packets tend to get lost in groups, which are called bursts. While the first few packets of the burst will be reconstructed without too much annoyance, the subsequent ones will not. If blind PLC is used, it will prolong a sound more than just a little bit. That will be more annoying.

Another PLC scheme is to merely send out redundant packets. If a packet is lost, its data is recovered from its corresponding redundant packet, which is hopefully not lost. Sending redundant packets, however, consumes substantial network bandwidth.

BRIEF SUMMARY OF THE INVENTION

The present invention overcomes these problems and limitations of the prior art.

Generally, the present invention provides devices, software and methods for encoding voice data to conceal packet loss. In addition to regular encoding, the invention teaches to encode an abbreviated portion of the frame, and transmit it redundantly afterwards. Abbreviating the frame conserves bandwidth compared to the prior art.

These and other features and advantages of the invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software and methods for encoding voice data to conceal packet loss. The invention is now described in more detail.

Figure 1A:
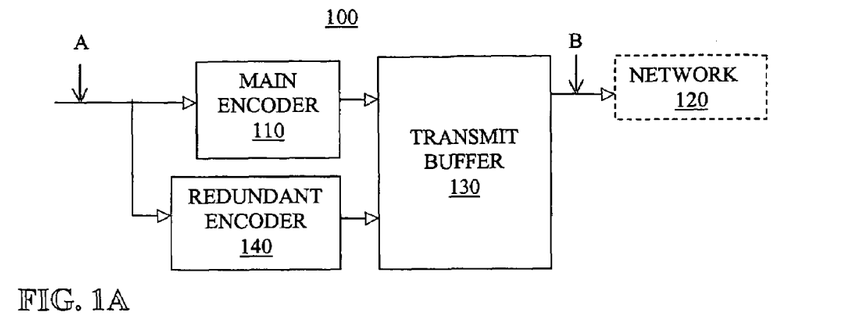
FIG. 1A is a block diagram of a transmitting device made according to an embodiment of the invention.

Referring to FIG. 1A, a transmitting device 100 made according to an embodiment of the invention is described. Device 100 includes a main encoder 110 for encoding a frame of voice data for transmission through a network 120. In addition, device 100 optionally includes a transmit buffer 130 adapted to receive inputs from the main encoder 110, for transmitting the encoded frame.

Importantly, device 100 includes a redundant encoder 140 for encoding only an abbreviated portion of the frame. The abbreviated encoded portion of the frame is redundantly transmitted through the network 120. Transmit buffer 130 receives inputs from the redundant encoder 140.

The main encoder 110, the redundant encoder 140 and transmit buffer 130 perform operations as is understood in conjunction with the below. The results of these operations are now described in more detail by examining two points A, B, in other words, as voice data in a frame is received (point A) and rendered (point B) by device 100 for network 120.

Figure 1B:
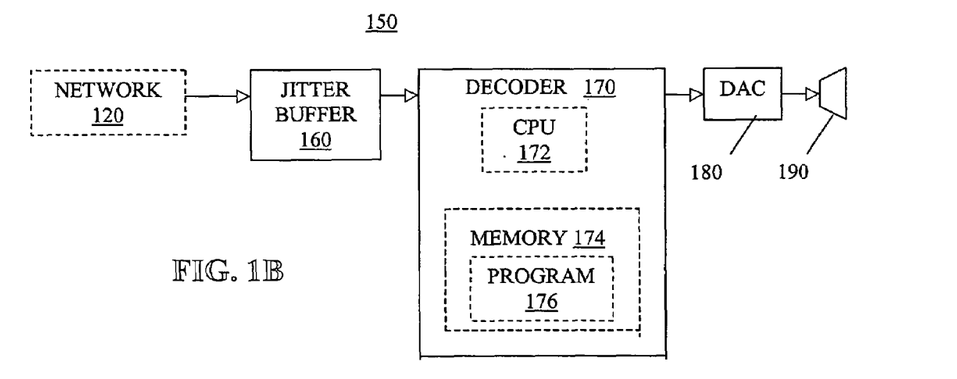
FIG. 1B is a block diagram of a receiving device made according to another embodiment of the invention.

Referring to FIG. 1B, a receiving device 150 according to the invention is described. Device 150 includes a network interface for interfacing with network 120. The network interface can be implemented as a stand-alone feature, or in conjunction with another component, such as a jitter buffer.

Optionally and preferably device 150 includes a jitter buffer 160. This stores a number of frames immediately as they are received from the network 120. The jitter buffer thus prevents the jitter that would be experienced if frames were played out in the same order they are received. That order could be scattered, due to the nature of transmission through the network 120.

Device 150 also includes a decoder 170. One or more of the components of device 150 can be implemented in combination with each other, consistently with components of this description. In the embodiment of FIG. 1B, decoder 170 includes a processor 172, which is also referred to as Central Processing Unit (CPU) 172, and a memory 174. The processor 172 is adapted to perform the method of the invention. Preferably it is so adapted by running a program 176 made according to the invention, which resides on memory 174.

Device 150 can also include other components, such as a Digital to Analog Converter (DAC) 180. This converts the decoded voice data into an analog signal, which can be input in a speaker 190.

Figure 2A:
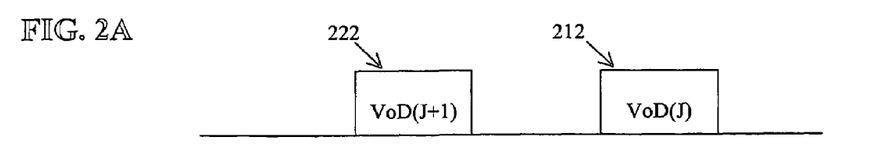
FIG. 2A is a diagram of data at a point A in the device of FIG. 1A.
Figure 2B:
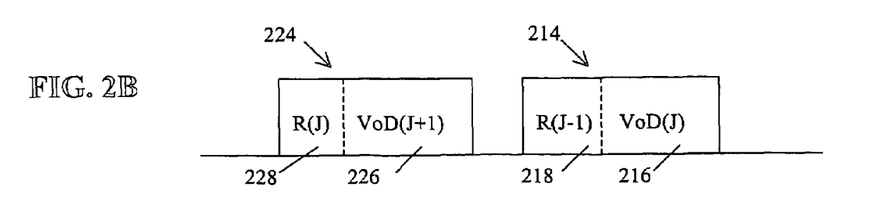
FIG. 2B is a diagram of data at a point B in the device of FIG. 1A, according to an embodiment of the invention.

Referring to FIGS. 2A and 2B, the rendering of the data is shown. FIG. 2A shows sequential voice data VoD(J), VoD(J+1), arranged in respective sequential groups 212, 222, as they pass point A of device 100. These data are depicted as groups, and also as packets, but that is done solely for the sake of convenience, to illustrate the processing. In fact, the data could equivalently have been shown as contiguous, as not yet encoded. In this case, J is an index of the data in the sequence of the voice stream.

FIG. 2B shows two groups 214, 224 of voice data, as they pass point B of device 100. These groups 214, 224, can be considered to be in packet form, where the leading header and the trailing header are not shown. Only the data is shown, also known as payload of the packet, for easier comparison with respective data of FIG. 2A.

Packet 214 contains a first section 216 with encoded data VoD(J), which is the encoded version of the corresponding data of group 212 of FIG. 2A. Similarly, packet 224 contains a first section 226 with encoded data VoD(J+1), which is the encoded version of the corresponding data of group 222 of FIG. 2A. The encoded versions of the data were encoded by main encoder 110 of device 100 of FIG. 1A.

Importantly, packet 214 contains a second section 218 with encoded data R(J−1), and packet 224 contains a second section 228 with encoded data R(J). Encoded data R(J) is an encoded form of the abbreviated data VoD(J), and was generated by redundant encoder 140. Abbreviating and encoding happen as is described elsewhere in this document. Similarly, encoded data R(J−1) is an encoded form of the abbreviated data VoD(J−1) that occurred just prior to data VoD(J) in the sequence of the voice data, and which is not shown in FIG. 2A.

Now it can be appreciated why the data of FIG. 2A is shown separated as groups. The data of group 212 correspond to the data of the first section 216 of packet 214. In addition, the data of group 222 correspond to the data of the first section 226 of packet 224. The corresponding groups are shown exactly below each other, for better ease of visualization. It should be remembered however, that the data in the first section 216 is encoded, whereas the data in group 212 is not encoded.

In the embodiment of FIG. 2B, the abbreviated portion of the frame is sent as part of the subsequent packet. That is not necessary, however, for practicing the present invention. The abbreviated portion can be sent in a stand-alone packet, although that is not preferred (due to high header overhead, it is more cost effective to package the redundant data with the payload of another packet of primary voice data).

In the embodiment of FIG. 2B, the abbreviated data R(J−1), R(J) is shown as occurring after their respective primary data VoD(J), VoD(J+1) of the same packet. That is not necessary, and the reverse order can be equivalently employed for practicing the present invention.

Equivalently, the redundant data of a frame can be in the packet of the next frame, or many packets before or after it. The latter is preferred if the losses are determined to occur in bursts.

For each frame, therefore, device 100 generates and sends redundant data for an abbreviated version of the frame. If a packet is not received, it can be substantially reconstructed, when its redundant data is received. Importantly, since the redundant data is abbreviated, substantial bandwidth is conserved, compared to the prior art.

According to a general embodiment of the invention, the redundant encoder 140 optionally encodes the abbreviated portion of the frame with respect to the data of a second frame, which attains economies in encoding. Preferably the second frame is the frame with which the abbreviated portion is sent, and thus will be there as a reference for decoding. Such encoding can be either by predictive coding or differential coding. This general embodiment of the invention can be applied in conjunction with other embodiments of the invention described below.

In the preferred embodiment of invention, the abbreviated portion of the frame is abbreviated according to attributes of the sound that the data that represents. Correspondingly, when the data is decoded, attributes of the whole sound are derived. These attributes are in turn used to complete construction of the concealment frame.

According to a first specific embodiment of the invention, the redundant encoder encodes a pitch period of the voice data of the frame. Preferably it also encodes a pitch cycle waveform of the voice data of the frame.

According to a second specific embodiment of the invention, the redundant encoder 140 encodes only selected sample data of the frame. In other words, it first makes the frame sparse, and then encodes it. In the preferred embodiment, the selected sample data is data that includes values above a preset threshold. In other words, only the peak values are encoded.

According to a third specific embodiment of the invention, the redundant encoder 140 encodes only data with values within a passed band of a sound bandwidth. The sound content of the data is analyzed, such as by action of a band pass filter (not shown separately). This way a passed band is isolated, and only its data is encoded. In the preferred embodiment, the band pass filter is a low pass filter, and the passed band is a low frequency band. In addition, the data of the passed band can be down-sampled, which further conserves bandwidth. Down sampling is most economical when the passed band is a low frequency band.

It is readily apparent that the present invention can be implemented by one or more devices that include logic circuitry. It can also be implemented by a device that includes a dedicated processor system, which can include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides programs, and method of operation of the programs. The programs are most advantageously implemented as program for a computing machine, such as a general purpose computer, a special purpose computer, a microprocessor, etc.

The invention also provides a storage medium that has at least one of the programs of the invention stored thereon. The storage medium is a computer-readable medium, such as a memory, and is read by the computing machine mentioned above.

A program is here, and generally, a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collocated with each other, but each only with a machine that houses a portion of the program. Alternately, some of these machines can operate automatically, without users and/or independently from each other.

Methods of the invention are now described.

Figure 3A:
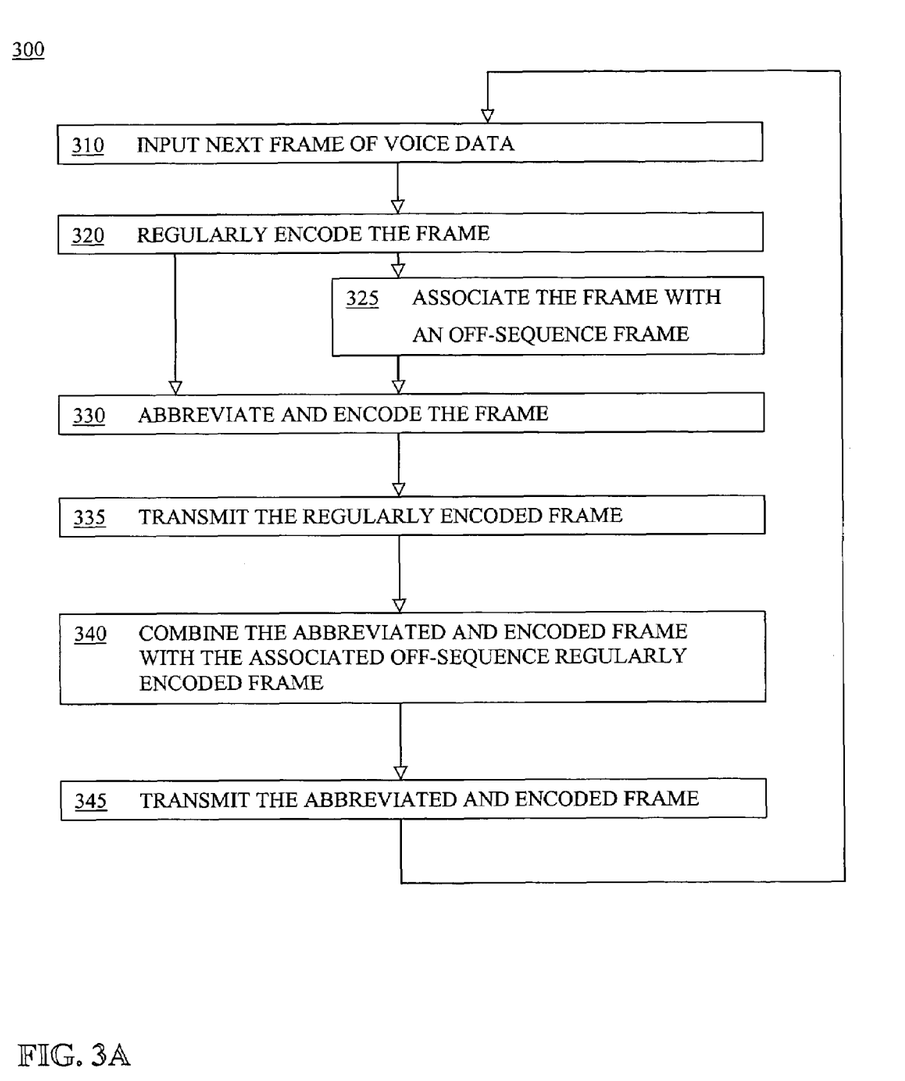
FIG. 3A is a flowchart of a method according to an embodiment of the invention.

Referring now to FIG. 3A, a flowchart 300 is used for illustrating a method according to an embodiment of the invention. It will be understood by a person skilled in the art that flowchart 300 can be a part of a larger flowchart.

According to a box 310, a next frame of voice data is input.

According to a box 320, the input frame is regularly encoded.

According to an optional box 325, the frame is associated with an off-sequence frame.

According to a box 330, the frame is abbreviated and encoded. This can be performed in a number of ways according to the present invention. A number of such ways are described below. In the preferred embodiment, abbreviating and encoding is performed according to attributes of the sound represented by the frame.

In addition, if the frame has been associated with an off sequence frame, abbreviating and encoding can optionally take place with respect to data of the off-sequence frame. Such abbreviating and encoding can be by predictive coding or differential coding.

According to a box 335, the regularly encoded frame is transmitted through the network to the recipient. This preferably happens in the form of a data packet.

According to an optional box 340, the abbreviated and encoded frame is combined with the associated off-sequence regularly encoded frame. Alternately and equivalently, the abbreviated data is encoded simultaneously with the data of the off-sequence frame.

According to a box 345, the abbreviated and encoded frame is also transmitted through the network to the recipient. If, as per box 340, the abbreviated and encoded frame has been combined with an off sequence regularly encoded frame, then they are transmitted together, preferably in the form of a data packet. It is also preferred, but not necessary for practicing the present invention, that associated data used for joint transmission is the same data that were used for abbreviating and encoding.

Figure 3B:
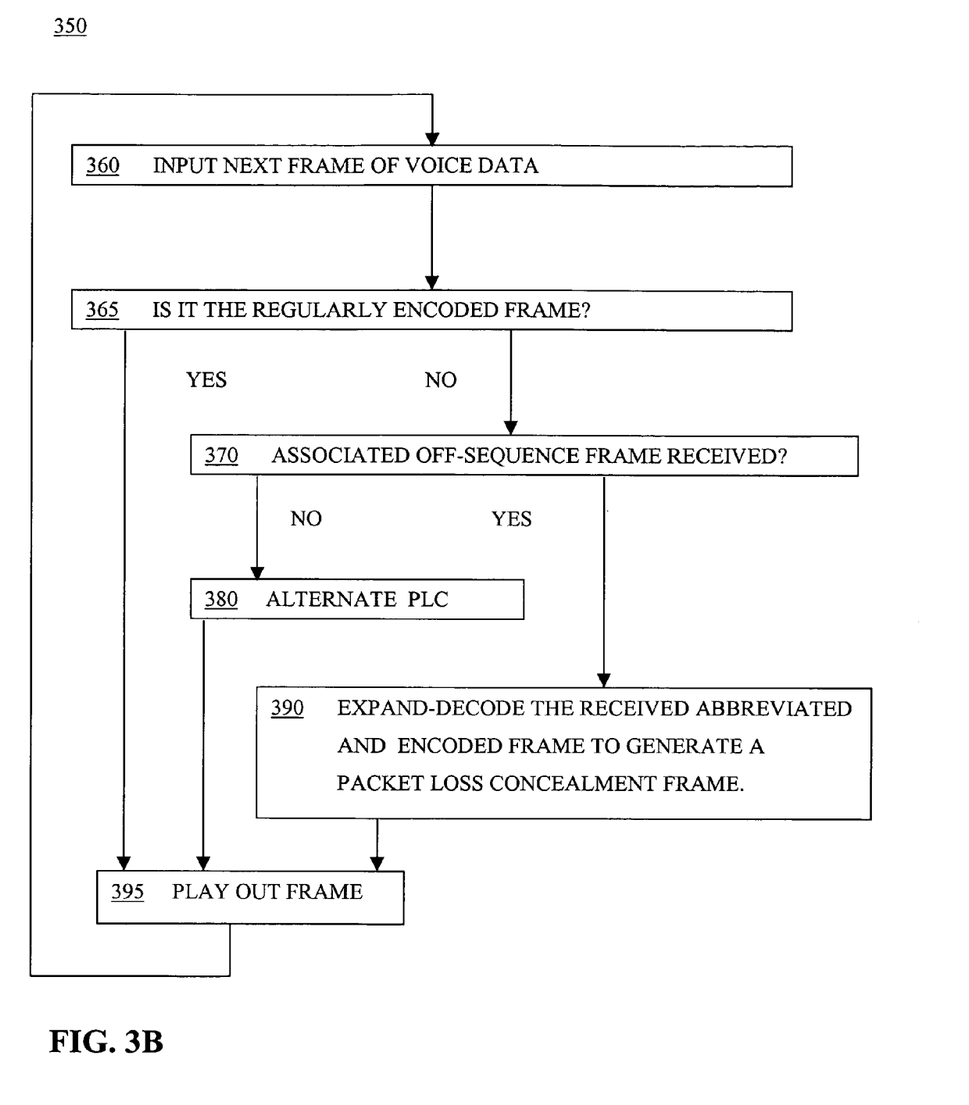
FIG. 3B is a flowchart of another method according to an embodiment of the invention.

Referring now to FIG. 3B, a flowchart 350 is used to illustrate another method according to an embodiment of the invention. The method is especially suited for devices receiving voice data through a network under an unreliable data protocol.

According to a box 360, the next frame of voice data is input. Preferably it is input from a jitter buffer.

According to a box 365, it is inquired whether the input frame is the regularly encoded frame. If yes, then according to a box 395, the regularly encoded frame is played out, and execution returns to box 360.

If not, then it means that the packet containing the regular frame has either been lost, or is taking too long to arrive in time for playout. In either case, that packet is deemed lost. Then, according to a box 370, it is inquired whether a specific associated off-sequence frame has been received that contains redundant data of the lost packet.

If not, then according to box 380, a packet loss concealment scheme is effected, such as is known in the art, and then execution continues with box 395.

If yes, then the redundant frame contains the abbreviated and encoded version of the lost frame.

According to a next box 390, the received abbreviated and encoded frame is expand-decoded to generate a concealment frame for the lost packet. The concealment frame is then played out to the user, who thus does not perceive the interruption in service from the lost packet.

Expand-decoding is a composite procedure, which can also be performed in separate steps according to the present invention, in other words, expanding and decoding. This composite procedure is generally an inverse process from the process of encoding of box 330. The person skilled in the art will be able to discern the appropriate way of performing box 390, also in view of the below.

According to the first specific embodiment of invention, abbreviating and encoding the frame is performed in terms of the pitch of the sound represented by the frame. More specifically, abbreviating and encoding includes performing pitch detection on the data of the frame, to extract a pitch period and a pitch cycle waveform. These are encoded and transmitted as data to the recipient. Correspondingly, expand-decoding includes using the extracted pitch period and the extracted pitch cycle waveform to construct the concealment frame.

Figure 4A:
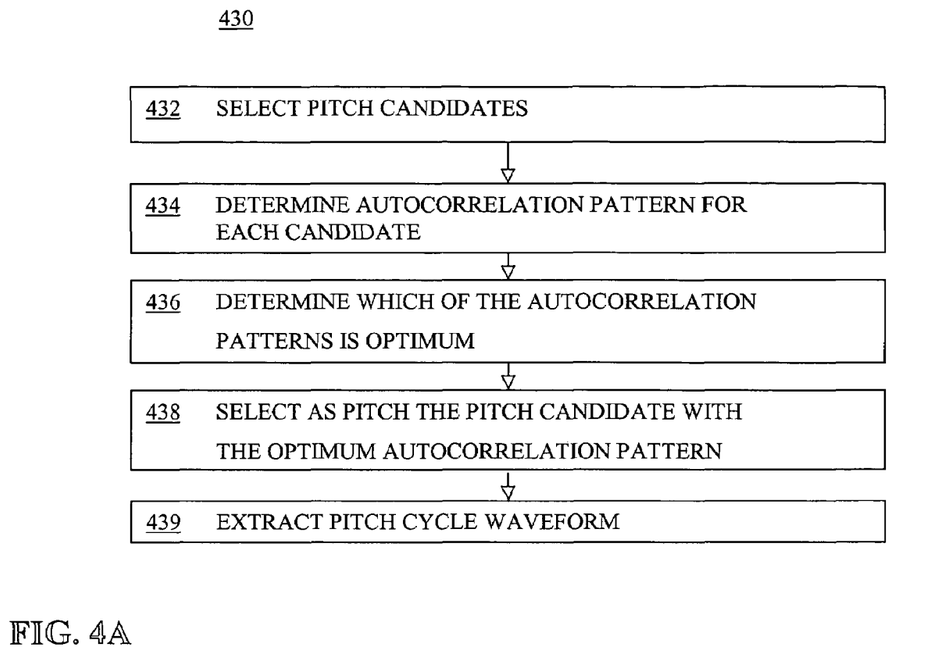
FIG. 4A is a flowchart of a method for performing a box 330 of FIG. 3A.

Referring now to FIG. 4A, a flowchart 433 presents a method for performing box 330 of FIG. 3A.

According to a box 432, pitch candidates are selected.

According to a box 434, an autocorrelation pattern is determined for each of the pitch candidates.

According to a box 436, it is determined which of the autocorrelation patterns is optimum, for the data that are present in the frame.

According to a box 438, the pitch candidate is selected that is found to have the optimum autocorrelation pattern.

According to a box 439, a pitch cycle waveform is extracted.

Figure 4B:
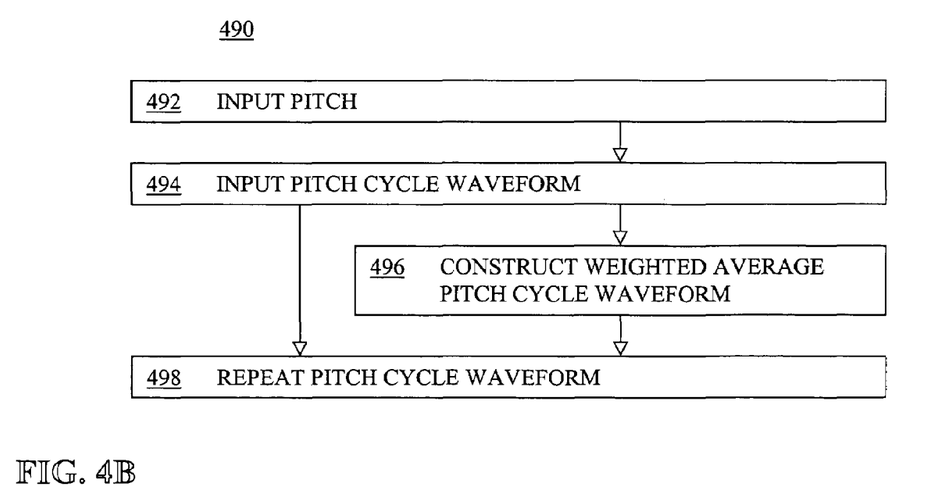
FIG. 4B is a flowchart of a method for performing a box 390 of FIG. 3B, which is especially suited for when the method of the flowchart of FIG. 4A has been used for performing box 330 of FIG. 3A.

Referring now to FIG. 4B, a flowchart 490 is used for illustrating a method for performing box 390 of flowchart 350, which is especially suitable if flowchart 430 has been performed to implement box 330A.

According to a box 492, the pitch is input. The pitch may have been derived by the recipient, or derived by the sender, encoded, and transmitted as a separate value, in which case the recipient decodes the value.

According to a box 494, the pitch cycle waveform is input. The pitch cycle waveform may have been derived by the recipient, or alternately derived by the sender, encoded, and transmitted as a separate value, in which case the recipient decodes the value.

According to an optional box 496, a weighted average is constructed for the pitch cycle waveform. The weighted average may optionally be constructed by first extracting a second pitch cycle waveform from data of at least one other frame, then combining with the second pitch cycle waveform. Alternately, a local weighted average may be transmitted periodically.

According to a box 498, the pitch cycle waveform is repeated a number of times, which forms at least a skeleton for a packet loss concealment frame. Optionally, other data can be filled in.

Figure 5A:
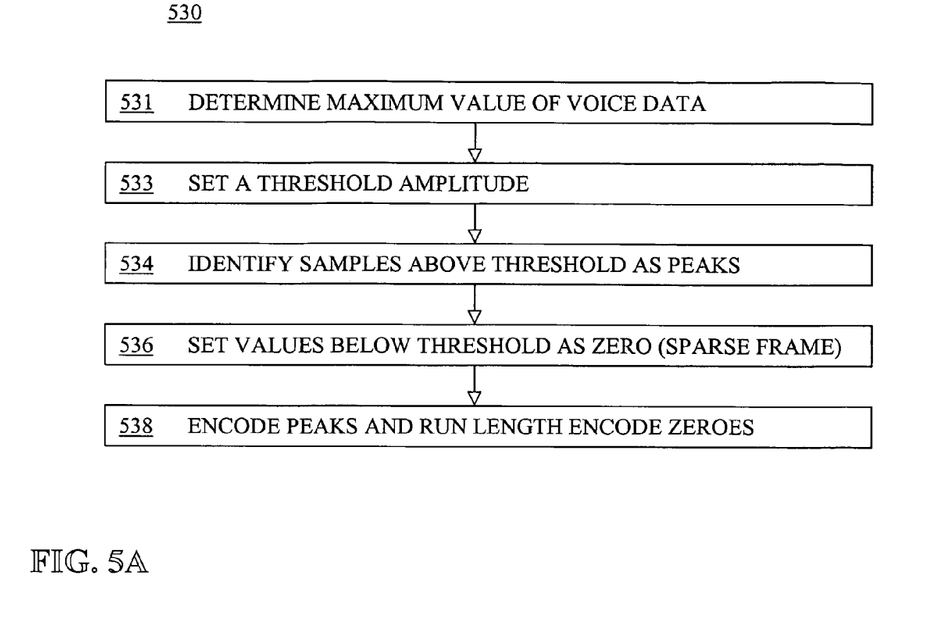
FIG. 5A is a flowchart of a method for performing a box 330 of FIG. 3A.

Referring now to FIG. 5A, a flowchart 530 is used to describe a second specific embodiment of invention. Generally, abbreviating and encoding includes reducing the frame to a sparse frame. Correspondingly, expand-decoding includes decoding the sparse frame, then expanding it by adding filler data. Preferably the frame is reduced according to an attribute of the sound represented by the data of the frame. In any event, optimized filler data is preferably determined from the nature of abbreviating and encoding.

According to an optional box 531, a maximum value of the voice data is determined.

According to a box 533, a threshold amplitude is set, which is also known as a peak threshold value. It is preferred to set the threshold amplitude in relation to what the maximum value is.

According to a box 534, data samples that have a value above the threshold amplitude are identified as peaks.

According to a box 536, the remaining data are set to a preset value, which is preferably zero. The remaining data are the ones that have not been identified as representing peaks.

According to a box 538, the data representing the peaks are encoded. The remaining data are also encoded.

Moreover, since the remaining data all represent the same value, they can be run length encoded. Again, the run length encoding process is optimum if that value is zero.

Figure 5B:
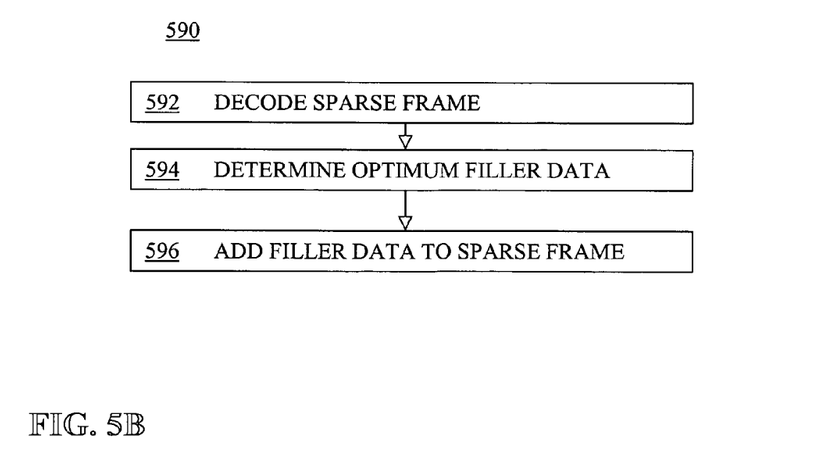
FIG. 5B is a flowchart of a method for performing a box 390 of FIG. 3B, which is especially suited for when the method of the flowchart of FIG. 5A has been used for performing box 330 of FIG. 3A.

Referring now to FIG. 5B, a flowchart 590 is used for illustrating a method for performing box 390 of flowchart 350, which is especially suitable if flowchart 530 has been performed to implement box 330.

According to a box 592, the sparse frame is decoded.

According to a box 594, the optimum filler data is determined.

According to a box 596, the filler data is added to the sparse frame. This forms the full packet loss concealment frame.

Figure 6A:
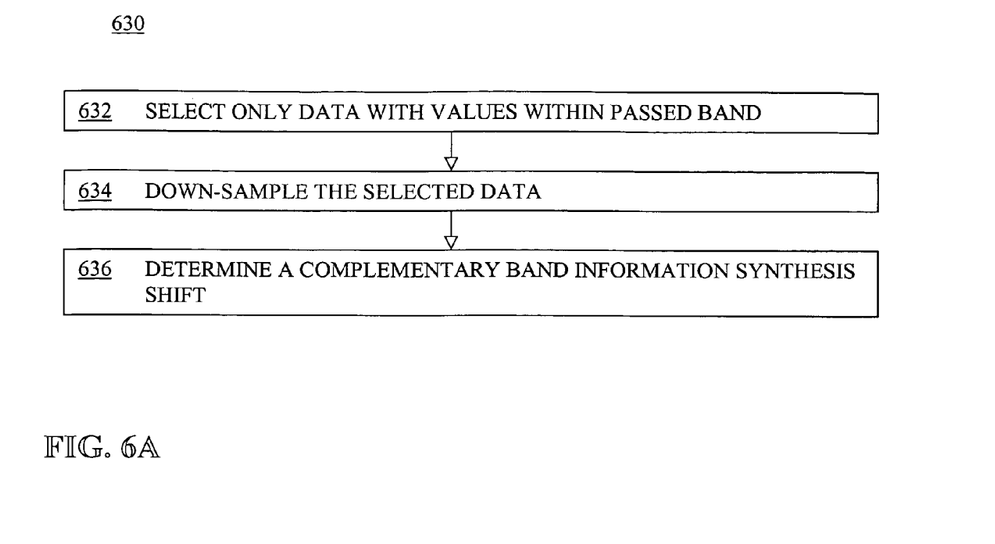
FIG. 6A is a flowchart of a method for performing a box 330 of FIG. 3A.

Referring now to FIG. 6A, a flowchart 630 is used to describe a third specific embodiment of invention. Generally, abbreviating and encoding includes selecting and encoding only data with values within a passed band of a sound bandwidth. Correspondingly, expand-decoding includes synthesizing a complementary band to the passed band, then combining the complementary band with the passed band.

According to a box 632, only the data is selected that contains values within the predetermined passed band. This is preferably accomplished by using a pass band filter. The pass band filter can be accomplished either as a separate hardware component, or as a separate digital component, or in software.

Preferably the passed band is a low-frequency band, defined by an upper limit. In that case, the pass band filter is low pass filter, which cuts off all data with values above the upper limit.

According to an optional box 634, the selected data is down-sampled. This means that data is periodically removed. When this occurs in conjunction with low pass filtering, a substantial quality of the sound is preserved. For example, filtering out all data with values above 2 kHz, and then down sampling by a factor of 2, substantially preserves the waveform, while reducing the required transmission bandwidth by 50%.

According to an optional box 636, a complementary band information synthesis shift is determined. This can be performed by the sender, by analyzing the frame prior to transmitting it. As will be seen below, the shift can alternately be determined by the receiver. The shift is used for determining the values of the data that has been filtered out, in relation to the values of the data that is passed.

Figure 6B:
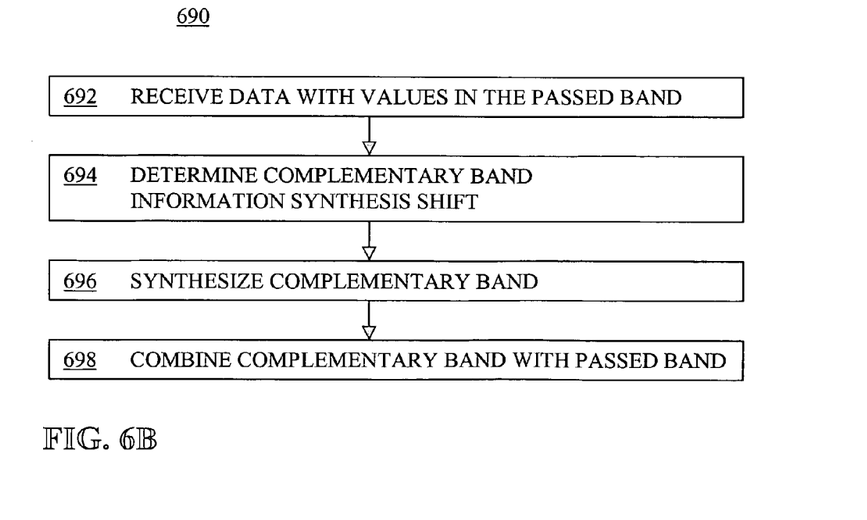
FIG. 6B is a flowchart of a method for performing a box 390 of FIG. 3B, which is especially suited for when the method of the flowchart of FIG. 6A has been used for performing box 330 of FIG. 3A.

Referring now to FIG. 6B, a flowchart 690 is used for illustrating a method for performing box 390 of flowchart 350, which is especially suitable if flowchart 630 has been performed to implement box 330.

According to a box 692, data is received with values in the passed band.

According to a box 694, the complementary band information synthesis shift is determined. If this has been performed by the sender, then its received value is merely decoded. If this has not been performed by the sender, then the shift is determined by analyzing data from other received frames. A way for performing this is by cross-correlating the data of the passed band with data from the other received frames that belong in the passed band.

According to a box 696, a complementary band is synthesized. Preferably, the complementary band is derived from the passed band using the synthesis shift.

According to a box 698, the complementary band is combined with the passed band. This informs the full packet loss concealment frame.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A transmitting device comprising:
a main encoder for encoding first and second frames of voice data for transmission through a network;
a redundant encoder for encoding only an abbreviated portion of the first and second frames for redundant transmission through the network; and
a transmit buffer receiving inputs from the main encoder and from the redundant encoder, for transmitting the encoded first frame in a first packet, and for transmitting both the encoded abbreviated portion of the first frame and the encoded second frame in a second packet;
where the encoded abbreviated portion of the first frame is usable for generating a concealment frame to play to a user as a backup for a lost frame.

2. The device of claim 1, wherein
the encoded abbreviated portion of the first frame comprises attributes of sound that the voice data represent.

3. The device of claim 1, wherein
the encoded abbreviated portion of the first frame comprises a pitch period of the voice data of the first frame.

4. The device of claim 1 wherein
the encoded abbreviated portion of the first frame comprises a pitch cycle waveform of the voice data of the first frame.

5. The device of claim 1, wherein
the encoded abbreviated portion of the first frame comprises only a selected sample data of the first frame.

6. The device of claim 5, wherein
the selected sample data is data that includes values above a preset threshold.

7. The device of claim 1, wherein
the encoded abbreviated portion of the first frame comprises only data with values within a passed band of a sound bandwidth.

8. A receiving device comprising:
a network interface for coupling to a network; and
a processor coupled with the network interface, wherein the processor is adapted to wait to receive an encoded frame of voice data and a coupled frame of voice data from the network, the coupled frame including an encoded redundant frame and an encoded second frame, and if the encoded frame is not received, to expand-decode the encoded redundant frame;
wherein the encoded redundant frame comprises an abbreviated portion of the encoded frame, which is used to generate a concealment frame to play to a user as a backup for a lost frame the encoded frame that was not received.

9. The device of claim 8, wherein
the encoded redundant frame is expand-decoded to generate attributes of sound that represents the data of the encoded frame.

10. The device of claim 8, wherein
the encoded redundant frame is expand-decoded to generate an extracted pitch period.

11. The device of claim 8, wherein
the encoded redundant frame is expand-decoded by adding filler data.

12. The device of claim 8, wherein the processor is further adapted to:
synthesize a complementary band to a passed band, and combine the complementary band with the passed band.

13. An article comprising: a storage medium, said storage medium having stored thereon instructions, that, when executed by at least one device, result in:
encoding a frame of voice data to form an encoded frame;
transmitting the encoded frame through a network;
encoding an abbreviated portion of the frame of voice data to form an encoded redundant frame
encoding a second frame of voice data to form an encoded second frame;
coupling the encoded redundant frame with the encoded second frame to form a coupled frame;
the encoded second frame being based on a different frame of voice data than the encoded redundant frame;
transmitting the coupled frame through the network.

14. The article of claim 13, wherein the instructions further result in:
coupling the encoded frame with a second encoded redundant frame prior to transmitting.

15. The article of claim 13, wherein
encoding the abbreviated portion of the frame of voice data to be performed by predictive coding.

16. The article of claim 13, wherein
encoding the abbreviated portion of the frame of voice data to be performed by differential coding.

17. The article of claim 13, wherein the instructions further result in:
encoding the abbreviated portion of the frame of voice data to be performed in relation to attributes of sound that the data represent.

18. An article comprising: a storage medium, said storage medium having stored thereon instructions, that, when executed by at least one device, result in:
waiting to receive an encoded frame of voice data from the network;
waiting to receive a coupled frame of voice data from the network, the coupled frame including an encoded redundant frame and an encoded second frame; and
if the encoded frame is not received, expand-decoding the encoded redundant frame;
wherein the encoded redundant frame comprises an abbreviated portion of the encoded frame which is used to generate a concealment frame to play to a user as a backup for a lost frame the encoded frame that was not received.

19. The article of claim 18, wherein
expand-decoding is performed to generate attributes of sound that represents data of the encoded frame.

20. The article of claim 18, wherein
expand-decoding includes using an extracted pitch period and an extracted pitch cycle waveform to construct the concealment frame.

21. The article of claim 18, wherein
expand-decoding includes adding filler data to the encoded redundant frame.

22. The article of claim 18, wherein the instructions further result in:
synthesizing a complementary band to a passed band; and
combining the complementary band with the passed band.

23. A method comprising:
encoding a frame of voice data to form an encoded frame;
transmitting the encoded frame through a network;
encoding an abbreviated portion of the frame of voice data to form an encoded redundant frame;
encoding a second frame of voice data to form an encoded second frame;
coupling the encoded redundant frame with the encoded second frame to form a coupled frame;
the encoded second frame being based on a different frame of voice data than the encoded redundant frame; and
transmitting the coupled frame through the network.

24. The method of claim 23, further comprising:
coupling the encoded frame with a second encoded redundant frame prior to transmitting.

25. The method of claim 23, wherein
encoding the abbreviated portion of the frame of voice data to be performed by predictive coding.

26. The method of claim 23, wherein
encoding the abbreviated portion of the frame of voice data to be performed by differential coding.

27. The method of claim 23, wherein
the abbreviated portion of the frame of voice data comprises attributes of sound that the frame represents.

28. The method of claim 23, wherein
encoding the abbreviated portion of the frame of voice data includes performing pitch detection to extract a pitch period and a pitch cycle waveform.

29. The method of claim 28, wherein performing pitch detection includes:
selecting a plurality of pitch candidates,
determining an autocorrelation pattern for each of the pitch candidates,
determining which one of the autocorrelation patterns is optimum, and
selecting the pitch candidate with the optimum autocorrelation pattern.

30. The method of claim 23, wherein
the encoded redundant frame contains less data than the encoded frame.

31. The method of claim 30, further comprising:
selecting a peak threshold value;
encoding data with values larger than the peak threshold value; and
setting data with values less than the peak threshold value equal to a preset value.

32. The method of claim 31, wherein encoding the abbreviated portion of the frame of voice data includes run length encoding the data with the preset value.

33. The method of claim 31, wherein
the preset value is zero.

34. The method of claim 23, wherein
encoding the abbreviated portion of the frame of voice data includes selecting and encoding only data with values within a passed band of a sound bandwidth.

35. The method of claim 34, wherein
the passed band is a low-frequency band.

36. The method of claim 35, further comprising:
down-sampling the passed band prior to encoding it.

37. A method comprising:
waiting to receive an encoded frame of voice data and a coupled frame of voice data from a network, the coupled frame including an encoded redundant frame and an encoded second frame; and
if the encoded frame is not received, expand-decoding the encoded redundant frame;
wherein the encoded redundant frame comprises an abbreviated portion of data of the encoded frame, which is used to generate a concealment frame to play to a user as a backup for the encoded frame that was not received.

38. The method of claim 37, wherein expand-decoding is performed to generate attributes of sound that represents the encoded frame.

39. The method of claim 37, wherein
expand-decoding includes using an extracted pitch period and an extracted pitch cycle waveform to construct the concealment frame.

40. The method of claim 39, wherein expand-decoding is performed by repeating the pitch cycle waveform.

41. The method of claim 39, wherein expand-decoding is performed by:
constructing a weighted average waveform from the pitch cycle waveform; and
repeating the weighted average waveform.

42. The method of claim 41, further comprising:
extracting a second pitch cycle waveform from data of at least one other frame, and
wherein the weighted average waveform is also constructed from the second pitch-cycle waveform.

43. The method of claim 37, wherein
expand-decoding includes adding filler data.

44. The method of claim 43, further comprising:
determining optimized filler data.

45. The method of claim 37, wherein expand-decoding includes:
  synthesizing a complementary band to a passed band; and
  combining the complementary band with the passed band.

46. The method of claim 45, wherein
  synthesizing the complementary band is performed by analyzing data from other received frames.

47. The method of claim 46, wherein synthesizing is performed by:
  determining a complementary band information synthesis shift from the passed band; and
  using the synthesis shift to derive the complementary band from the passed band.

48. The method of claim 47, wherein the synthesis shift is determined by:
  cross-correlating the frame of the passed band with data from the other received frames.

49. The method of claim 47, wherein the synthesis shift is determined by:
  analyzing the encoded frame prior to transmitting it.

50. A receiving device comprising:
  coupling means for coupling to a network; and
  processing means adapted to wait to receive an encoded frame of voice data and a coupled frame of voice data from the network, the coupled frame including an encoded redundant frame and an encoded second frame, and if the encoded frame is not received, to expand-decode the encoded redundant frame;
  wherein the encoded redundant frame comprises an abbreviated portion of the encoded frame, which is used to generate a concealment frame to play to a user as a backup for a lost frame the encoded frame that was not received.

51. The device of claim 50, wherein
  the encoded redundant frame is expand-decoded to generate attributes of sound that represents the encoded frame.

52. The device of claim 50, wherein
  the encoded redundant frame is expand-decoded by using an extracted pitch period and an extracted pitch cycle waveform to construct the concealment frame.

53. The device of claim 50, wherein
  the encoded redundant frame is expand-decoded by adding filler data.

54. The device of claim 50, wherein the processor is further adapted to:
  synthesize a complementary band to a passed band, and
  combine the complementary band with the passed band.

55. The method of claim 37 further comprising playing the concealment frame to a user in an attempt to conceal to the user the fact that the encoded frame was not received.

* * * * *